US011303327B2

(12) United States Patent
Malik et al.

(10) Patent No.: US 11,303,327 B2
(45) Date of Patent: Apr. 12, 2022

(54) POWER DENSITY EXPOSURE CONTROL

(71) Applicant: QUALCOMM Incorporated, San Diego, CA (US)

(72) Inventors: Rahul Malik, San Diego, CA (US); Raghu Narayan Challa, San Diego, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/861,970

(22) Filed: Apr. 29, 2020

(65) Prior Publication Data

US 2020/0350959 A1 Nov. 5, 2020

Related U.S. Application Data

(60) Provisional application No. 62/843,323, filed on May 3, 2019.

(51) Int. Cl.
*H04B 7/04* (2017.01)
*H04B 7/0408* (2017.01)
(Continued)

(52) U.S. Cl.
CPC ......... *H04B 7/0408* (2013.01); *H04B 7/0469* (2013.01); *H04B 7/0617* (2013.01); *H04B 7/0623* (2013.01); *H04B 7/0682* (2013.01)

(58) Field of Classification Search
CPC .. H04B 7/0408; H04B 7/0469; H04B 7/0682; H04B 7/0623; H04B 7/0617; H04B 7/0404; H04B 7/0695
See application file for complete search history.

(56) References Cited

U.S. PATENT DOCUMENTS 8,344,956 B2 * 1/2013 Montgomery ........... H01Q 3/26
343/702
8,643,551 B2 2/2014 Szini et al.
(Continued)

FOREIGN PATENT DOCUMENTS

EP 3605868 A2 2/2020
WO 2018127151 A1 7/2018
WO 2018174636 A2 9/2018

OTHER PUBLICATIONS

International Search Report and Written Opinion—PCT/US2020/030731—ISA/EPO—dated Jul. 27, 2020.
(Continued)

*Primary Examiner* — Hashim S Bhatti
(74) *Attorney, Agent, or Firm* — Harrity & Harrity, LLP

(57) ABSTRACT

Various aspects of the present disclosure generally relate to wireless communication. In some aspects, a user equipment (UE) may select two transmit beams from a plurality of beams that the UE is capable of forming using an antenna array of the UE that includes a plurality of antenna elements, wherein the two transmit beams are to be used to transmit two corresponding layers of information; determine, after selecting the two transmit beams, a phase difference to be applied to the two transmit beams based at least in part on the two transmit beams; and transmit the information on the two corresponding layers concurrently via the two transmit beams using the phase difference. Numerous other aspects are provided.

90 Claims, 9 Drawing Sheets

(51) Int. Cl.
　　　*H04B 7/0456*　　(2017.01)
　　　*H04B 7/06*　　　(2006.01)

(56) References Cited

U.S. PATENT DOCUMENTS

| 8,929,828 B2 | 1/2015 | Hochwald |
| 9,083,410 B2 | 7/2015 | Kludt |
| 2013/0257655 A1* | 10/2013 | Hu .......................... H01Q 3/40 |
| | | 342/373 |
| 2016/0036506 A1* | 2/2016 | Kanai ................. H04B 7/0617 |
| | | 370/329 |

OTHER PUBLICATIONS

Vivo: "Discussion on Codebook Based UL Transmission", 3GPP Draft, R1-1717467, Discussion on Codebook Based UL Transmission, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051340655, 7 pages, Retrieved from the Internet: URL: http://www.3gpp.org/ftp/Meetings_3GPP_SYNC/RAN1/Docs/. [retrieved on Oct. 8, 2017] pp. 1.2.4.
Hochwald B.M., et al., "Minimizing Exposure to Electromagnetic Radiation in Portable Devices", Information Theory and Applications Workshop, 2012, 7 Pages.

\* cited by examiner

US 11,303,327 B2

POWER DENSITY EXPOSURE CONTROL

CROSS-REFERENCE TO RELATED APPLICATION

This patent application claims priority to U.S. Provisional Patent Application No. 62/843,323 ("the Prior application"), filed on May 3, 2019, entitled "POWER DENSITY EXPOSURE CONTROL," and assigned to the assignee hereof. The disclosure of the Prior application is considered part of and is incorporated by reference in this patent application as if fully set forth below in its entirety and for all applicable purposes.

TECHNICAL FIELD

Aspects of the technology described below generally relate to wireless communication and to techniques and apparatuses for power density exposure control. Some techniques and apparatuses described herein enable and provide wireless communication devices and systems configured for contextualized reduction of user exposure to power density in association with use of a UE.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

3GPP specifies use of millimeter wave (mmW) as a carrier for fifth generation (5G)-New Radio (NR) systems. 5G-NR mmW is a time division duplex system (TDD) and uses mmW for both uplink and downlink. 5G-NR communications systems are designed to maintain coverage at low power consumption. In the context of 5G-NR mmW, far-field radiation characteristics of an antenna module and placement of the antenna module in a UE are considered in the context of maintaining coverage at low power consumption. Some regulatory bodies have set limits on mmW power density (PD) exposure that is safe for humans. Configuring radio frequency (RF) devices with managed radiation emissions, sometimes referred to as maximum permissible RF exposure or specific adsorption rate, is of interest to many. A device is generally expected to prevent PD exposure over government-set limits while performing RF transmissions, such as mmW-related communications that may use communication beams (e.g., transmission beams and/or reception beams).

NR frequency range 2 (FR-2) supports multi-layer transmission (e.g., multi-beam transmission from a UE). Different layers map to different transmit ports corresponding to different antennas. The antennas can be dual-polarized (e.g., supporting polarization multiple input multiple output (MIMO)) or independent (e.g., supporting spatial MIMO). Various factors, including relative phase shift between different ports, antennas, layers, and/or the like can impact a PD associated with a UE. In 3GPP, there is no specific requirement on absolute value of a relative phase shift between different antenna ports, and a UE may not be aware of this relative phase shift. In addition, in an absence of the UE being aware of a relative phase shift, the UE has to assume a worst-case scenario for PD exposure. This limits uplink transmission power of the UE to an uplink transmission power compatible with the worst-case scenario.

Some techniques and apparatuses described herein provide a UE that is capable of determining a relative phase difference between two beams (e.g., a first beam and a second beam) to be transmitted from the UE based at least in part on particular transmit beams included in the two transmit beams, transmit power levels to be used for the two transmit beams, and/or one or more other factors described herein. For example, the UE may determine the relative phase difference such that a PD exposure associated with transmission of the two beams satisfies a threshold. In this way, the UE can reduce or eliminate excessive PD exposure to a user of the UE without having to assume a worst-case scenario for PD exposure. This reduces or eliminates limitations on uplink transmission power that would otherwise occur as a result of having to assume a worst-case scenario for PD exposure, thereby improving operations of the UE, improving communications between the UE and a wireless communication device, and/or the like.

In some aspects, a method of wireless communication, performed by a UE, may include selecting two transmit beams from a plurality of beams that the UE is capable of forming using an antenna array of the UE that includes a plurality of antenna elements, wherein the two transmit beams are to be used to transmit two corresponding layers of information. The method may include determining, after selecting the two transmit beams, a phase difference to be applied to the two transmit beams based at least in part on the two transmit beams. The method may include transmitting the information on the two corresponding layers concurrently via the two transmit beams using the phase difference.

In some aspects, a UE for wireless communication may include a memory and one or more processors operatively coupled to the memory. The memory and the one or more processors may be configured to select two transmit beams from a plurality of beams that the UE is capable of forming using an antenna array of the UE that includes a plurality of antenna elements, wherein the two transmit beams are to be used to transmit two corresponding layers of information. The memory and the one or more processors may be configured to determine, after selecting the two transmit beams, a phase difference to be applied to the two transmit beams based at least in part on the two transmit beams. The memory and the one or more processors may be configured to transmit the information on the two corresponding layers concurrently via the two transmit beams using the phase difference.

In some aspects, a non-transitory computer-readable medium may store one or more instructions for wireless communication. The one or more instructions, when executed by one or more processors of a UE, may cause the UE and/or the one or more processors to select two transmit beams from a plurality of beams that the UE is capable of forming using an antenna array of the UE that includes a plurality of antenna elements, wherein the two transmit beams are to be used to transmit two corresponding layers of information. The one or more instructions, when executed by one or more processors of a UE, may cause the UE and/or the one or more processors to determine, after selecting the two transmit beams, a phase difference to be applied to the two transmit beams based at least in part on the two transmit beams. The one or more instructions, when executed by one or more processors of a UE, may cause the UE and/or the one or more processors to transmit the information on the two corresponding layers concurrently via the two transmit beams using the phase difference.

In some aspects, an apparatus for wireless communication may include means for selecting two transmit beams from a plurality of beams that the apparatus is capable of forming using an antenna array of the apparatus that includes a plurality of antenna elements, wherein the two transmit beams are to be used to transmit two corresponding layers of information. The apparatus may include means for determining, after selecting the two transmit beams, a phase difference to be applied to the two transmit beams based at least in part on the two transmit beams. The apparatus may include means for transmitting the information on the two corresponding layers concurrently via the two transmit beams using the phase difference.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
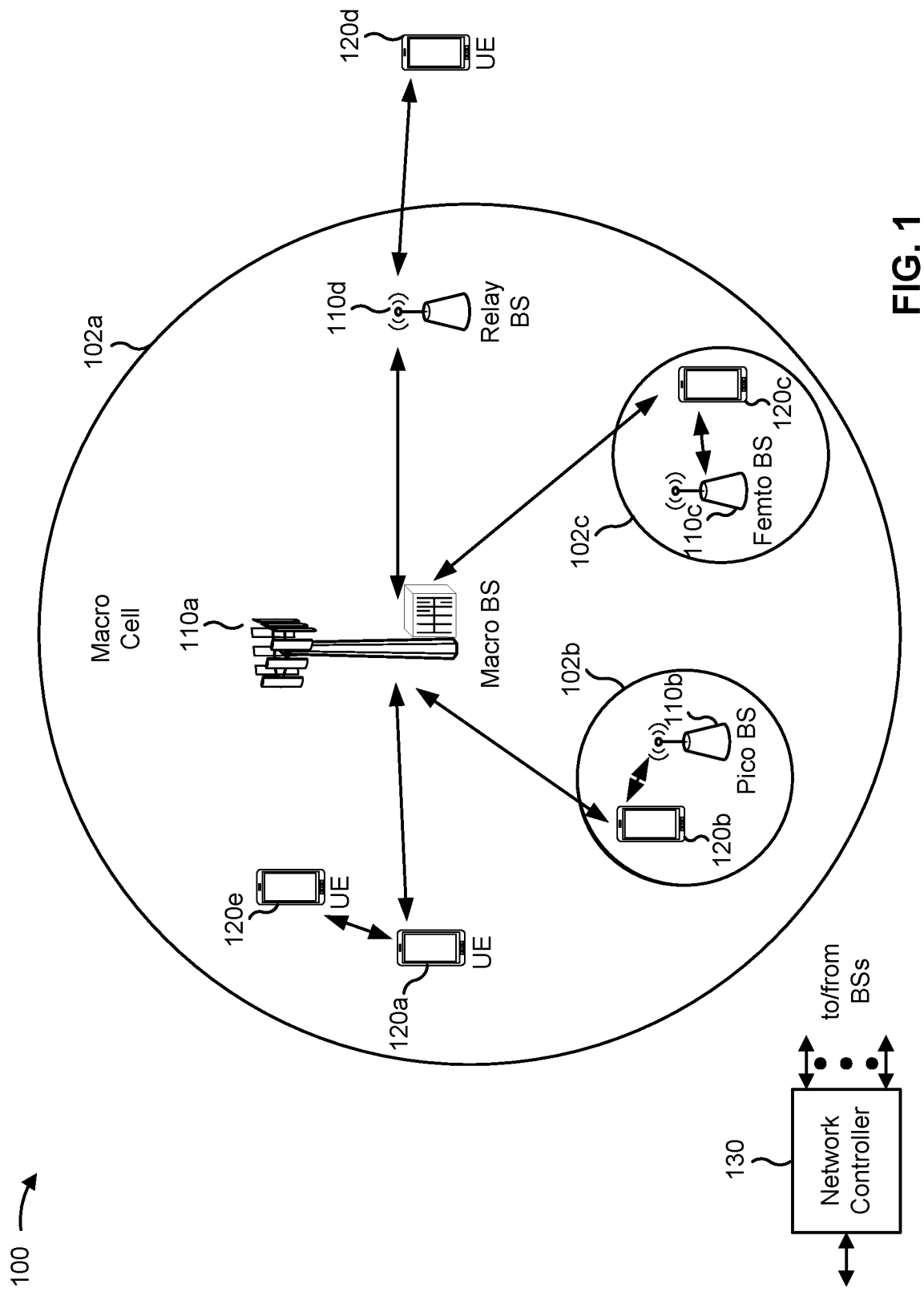
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency (RF)-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
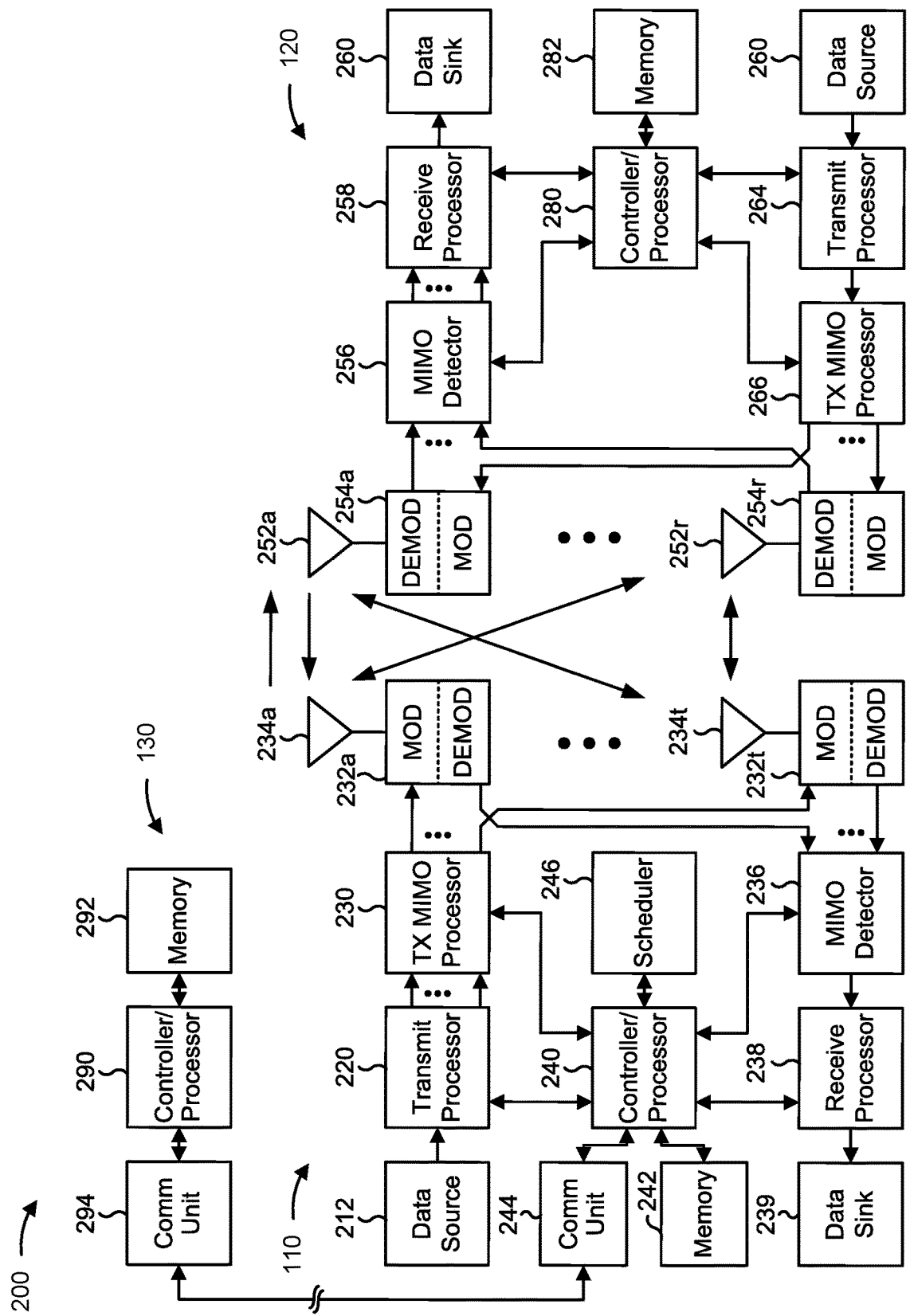
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power density exposure control, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for determining a relative phase difference to be applied to two transmit beams of the UE based at least in part on: particular transmit beams included in the two transmit beams, or transmit power levels to be used for the two transmit beams; means for transmitting, to a wireless communication device, the two transmit beams after determining the relative phase difference, wherein the relative phase difference is applied to the two transmit beams; and/or the like. Additionally, or alternatively, the variety of means may include means for selecting two transmit beams from a plurality of beams that the UE is capable of forming using an antenna array of the UE that includes a plurality of antenna elements, wherein the two transmit beams are to be used to transmit two corresponding layers of information; means for determining, after selecting the two transmit beams, a phase difference to be applied to the two transmit beams based at least in part on the two transmit beams; means for transmitting the information on the two corresponding layers concurrently via the two transmit beams using the phase difference; and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like. Additionally, or alternatively, structural components that carry out functions of such means may include one or more components of UE 120 described below in connection with FIG. 3.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3:
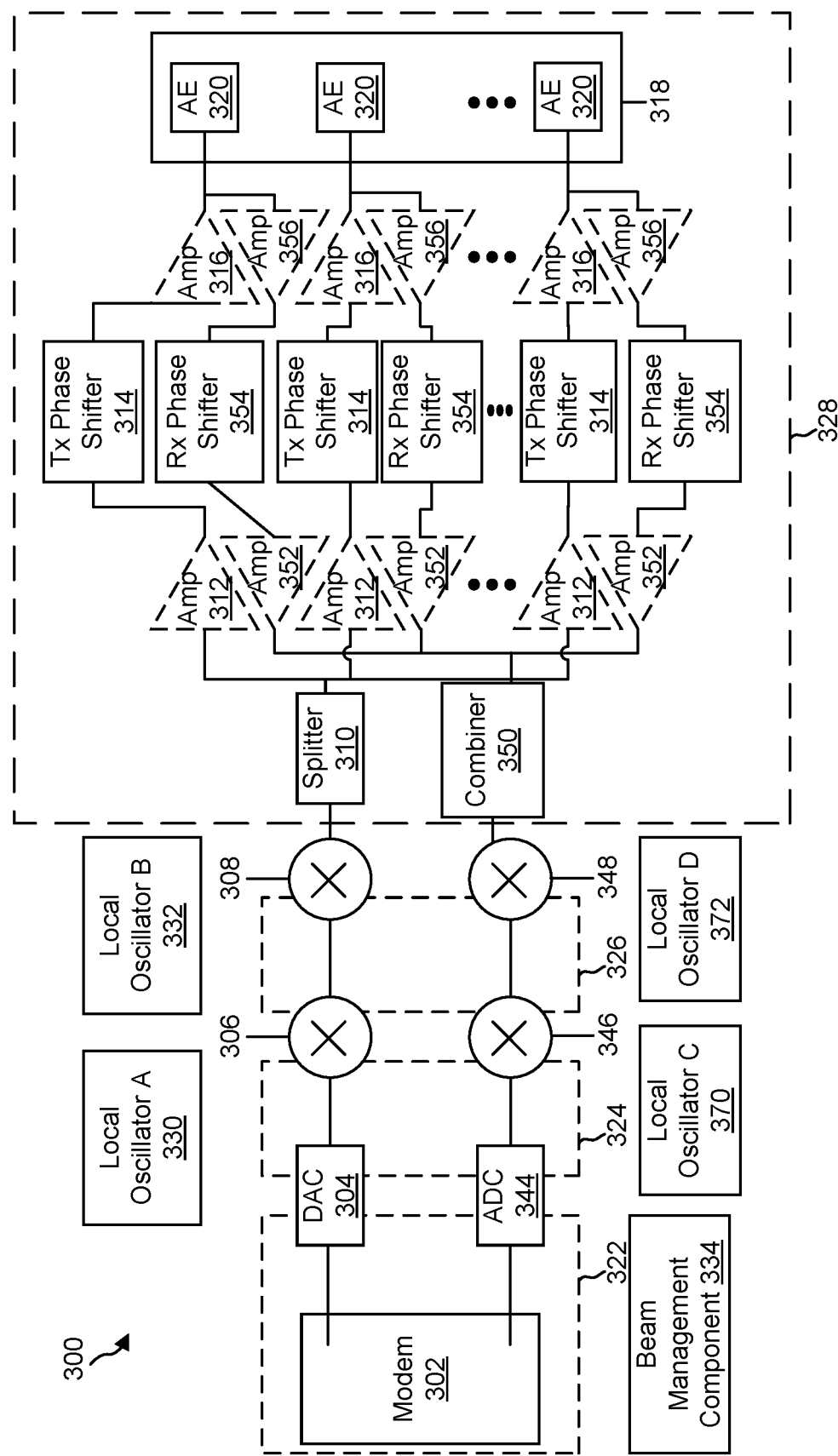
FIG. 3 illustrates an example of an architecture 300 that supports beamforming for millimeter wave (mmW) communications, in accordance with various aspects of the present disclosure

FIG. 3 illustrates an example of an architecture 300 that supports beamforming for millimeter wave (mmW) communications, in accordance with various aspects of the present disclosure. In some examples, architecture 300 may implement aspects of wireless communication systems described herein. In some aspects, FIG. 3 may show an example of the transmitting device (e.g., a first wireless device, UE, or BS) and/or a receiving device (e.g., a second wireless device, UE, or BS) as described herein.

Broadly, FIG. 3 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes a plurality of first amplifiers 312, a plurality of phase shifters 314, a plurality of second amplifiers 316, and an antenna array 318 that includes a plurality of antenna elements 320. Transmission lines or other waveguides, wires, traces, or the like are shown connecting the various components to illustrate how signals to be transmitted may travel between components. Boxes 322, 324, 326, and 328 indicate regions in the architecture 300 in which different types of signals travel or are processed. Specifically, box 322 indicates a region in which digital baseband signals travel or are processed, box 324 indicates a region in which analog baseband signals travel or are processed, box 326 indicates a region in which analog intermediate frequency (IF) signals travel or are processed, and box 328 indicates a region in which analog radio frequency (RF) signals travel or are processed. The architecture also includes a local oscillator A 330, a local oscillator B 332, and a beam management component 334.

Each of the antenna elements 320 may include one or more sub-elements (not shown) for radiating or receiving RF signals. For example, a single antenna element 320 may include a first sub-element cross-polarized with a second sub-element that can be used to independently transmit cross-polarized signals. The antenna elements 320 may include patch antennas or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases some processing or filtering (not shown) may take place at the IF. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF, or the frequency at which signals will be transmitted or received. The modem 302 and/or the beam management component 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into a plurality of identical or nearly identical RF signals, as denoted by its presence in box 328. In other examples, the split may take place with any type of signal including with baseband digital, baseband analog, or IF analog signals. Each of these signals may correspond to an antenna element 320 and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some implementations. In one implementation, both the first amplifier 312 and second amplifier 316 are present. In another, neither the first amplifier 312 nor the second amplifier 316 is present. In other implementations, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used. The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or beam management component 334) to provide independent control of the gain for each antenna element 320. For example, the modem 302 and/or the beam management component 334 may have at least one control line connected to each of the splitter 310, first amplifiers 312, phase shifters 314, and/or second amplifiers 316 which may be used to configure a gain to provide a desired amount of gain for each component and thus each antenna element 320.

The phase shifter 314 may provide a configurable phase shift or phase offset to a corresponding RF signal to be transmitted. The phase shifter 314 could be a passive phase shifter not directly connected to a power supply. Passive phase shifters might introduce some insertion loss. The second amplifier 316 could boost the signal to compensate for the insertion loss. The phase shifter 314 could be an active phase shifter connected to a power supply such that the active phase shifter provides some amount of gain or prevents insertion loss. The settings of each of the phase shifters 314 are independent meaning that each can be independently set to provide a desired amount of phase shift or the same amount of phase shift or some other configuration. The modem 302 and/or the beam management component 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifier 356 may be connected to the same antenna arrays 318, e.g., for TDD operations. The first amplifier 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the beam management component 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signal input to combiner 350 have the same magnitude. The amplifiers 352 and/or 356 are illustrated in dashed lines because they might not be necessary in some implementations. In one implementation, both the amplifier 352 and the amplifier 356 are present. In another, neither the amplifier 352 nor the amplifier 356 are present. In other implementations, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal, as denoted by its presence in box 328. The combiner 350 may be a passive combiner, e.g., not connected to a power source, which may result in some insertion loss. The combiner 350 may be an active combiner, e.g., connected to a power source, which may result in some signal gain. When combiner 350 is an active combiner, it may provide a different (e.g., configurable) amount of gain for each input signal so that the input signals have the same magnitude when they are combined. When combiner 350 is an active combiner, it may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 are input to modem 302 for baseband processing (e.g., decoding, de-interleaving, and/or the like).

The architecture 300 is given by way of example only to illustrate an architecture for transmitting and/or receiving signals. It will be understood that the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions. Furthermore, mixers, splitters, amplifiers, phase shifters, and other components may be located in different signal type areas (e.g., different ones of the boxes 322, 324, 326, 328) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In one implementation of this configuration, there may be a plurality of IF to RF mixers (e.g., for each antenna element chain) within the second mixer 308, and the local oscillator B 332 would supply different local oscillator signals (with different phase offsets) to each IF to RF mixer.

The modem 302 and/or the beam management component 334 may control one or more of the other components 304-472 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using a plurality of signals on different antenna elements where one or more, or all, of the plurality signals are shifted in phase relative to each other. The formed beam may carry physical or higher layer reference signals or information. As each signal of the plurality of signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the plurality of signals relative to each other. The beam management component 334 may be located partially or fully within one or more other components of the architecture 300. For example, the beam management component 334 may be located within the modem 302 in at least one implementation.

As indicated above, FIG. 3 is provided as an example. Other examples may differ from what is described with regard to FIG. 3.

3GPP specifies use of millimeter wave (mmW) as a carrier for fifth generation (5G)-New Radio (NR) systems. 5G-NR mmW is a time division duplex (TDD) system and uses mmW for both uplink and downlink. 5G-NR communications systems are designed to maintain coverage at low power consumption. In the context of 5G-NR mmW, far-field radiation characteristics of an antenna module and placement of the antenna module in a UE are considered in the context of maintaining coverage at low power consumption. Some regulatory bodies have set limits on mmW power density (PD) exposure that is safe for humans. A device is expected to prevent PD exposure over the limits while performing mmW-related operations. The PD exposure may be expressed in units of milliwatts per square centimeter ($mW/cm^2$). For a maximum permissible exposure (MPE) limit, the PD exposure may be defined for a frequency range and/or an electric field strength. In some cases, guidelines for MPE are defined in terms of power density (in $mW/cm^2$), electric field strength (in units of volts per meter, or V/m), and magnetic field strength (in units of amperes per meter, or A/m).

NR frequency range 2 (FR-2), sometimes referred to as millimeter wave, supports multi-layer transmission (e.g., multi-beam transmission from a UE). Different layers map to different transmit ports corresponding to different antennas. The antennas can be dual-polarized (e.g., supporting polarization multiple input multiple output (MIMO)) or independent (e.g., supporting spatial MIMO). As used herein, the term layer may refer to a MIMO layer. Different layers may be precoded differently. Different layers (e.g., before precoding) may correspond to different streams of data (e.g., after precoding). In some aspects, different codewords are transmitted using different layers. In some other aspects, additionally and/or alternatively, the same codeword is transmitted using different layers.

Various factors, including relative phase shift between different ports, antennas, layers, and/or the like can impact a PD associated with a UE. For example, relative phases and amplitudes of transmissions impact radiation from a source, which impacts a power density of the transmissions. In 3GPP, there is no specific requirement on absolute value of a relative phase shift between different antenna ports and a UE may not be aware of this relative phase shift. In addition, in an absence of the UE being aware of a relative phase shift, the UE has to assume a worst-case scenario for PD exposure. This worst-case-assumption scenario limits uplink transmission power of the UE to an uplink transmission power compatible with the worst-case scenario.

Techniques discussed herein enable and provide communications that approach PD management differently than worst-case-assumption scenarios. Some techniques and apparatuses described herein provide a UE that is capable of determining a relative phase difference between multiple beams (e.g., two beams) to be transmitted from a UE. Phase difference determinations can be based, for example, at least in part on particular transmit beams included in the transmit beams, transmit power levels to be used for the transmit beams, and/or one or more other factors described herein. In a particular example, two beams may be used. For example, a UE may determine a relative phase difference between two beams such that a PD exposure associated with transmission of the two beams satisfies a threshold. In this way, the UE can reduce or eliminate excessive PD exposure to a user of the UE without having to assume a worst-case scenario for PD exposure. This reduces or eliminates limitations on uplink transmission power that would otherwise occur as a result of having to assume a worst-case scenario for PD exposure, thereby improving operations of the UE, improving communications between the UE and a wireless communication device, and/or the like.

For sub-6 GHz communications (sometimes referred to as frequency range 1, or FR1), single-layer communications, or non-orthogonally polarized communications, individual antenna ports can be leveraged for "digital" beamforming. In this approach, the UE can reduce electromagnetic exposure to a user by either modifying the information to be transmitted (e.g., by applying a codeword to the information transmitted using multiple antennas, where the codeword reduces the effective code rate, and where the codeword can be determined experimentally and the resulting electromagnetic exposure can be measured) or modifying a direction of a transmit beam, which can reduce electromagnetic exposure directed toward a user. When information is modified using a codeword, this may result in a loss of information capacity (e.g., a lower code rate) depending on the effective code rate of the codebook from which the codeword is selected (e.g., only some modulation symbols may be used depending on electromagnetic exposure resulting from different modulation symbols). When the direction of a transmit beam is modified, this may result in a suboptimal transmit beam (e.g., with a less favorable beam parameter, such as RSRP, RSSI, and/or the like, as compared to a transmit beam that would otherwise be used).

For millimeter wave communications (sometimes referred to as frequency range 2, or FR2), multi-layer communications, or orthogonally polarized communications, beamforming can be independently applied to individual antenna ports and individual data streams, unlike the digital beamforming scenarios described above. As described in more detail herein, by modifying a phase difference between two independent beams, electromagnetic exposure (e.g., PD exposure) can be reduced in a near-field area proximate and/or surrounding a UE (e.g., by reducing near-field combinations between transmissions at the user). This approach is transparent to a receiver because applying and/or modifying a phase difference to two independent beams appears to the receiver as channel phase. Applying a phase difference between beams enables using phase difference as an indication of signal characterization. The channel phase can be compensated by a receiver (e.g., without information about the phase applied at the transmitter) unlike approaches for non-orthogonally polarized communications described above. Because a receiver does not need to have any explicit information of the phase applied at the transmitter, no signaling between transmitter and receiver is needed for this approach. Because the receiver and the transmitter need not signal each other regarding phase information, each device can conserve power, and reduced signaling conserves network resources and can improve throughput. This approach also conserves memory resources of the receiver that would otherwise be used to store information about the phase applied at the transmitter.

Furthermore, in some millimeter wave communications, information on different layers may be transmitted on different beams using different (e.g., orthogonal) polarizations. By adjusting a phase difference between two layers or data streams on two transmit beams, there is no impact on beam direction because each layer or data stream is orthogonally polarized and is associated with independent beamforming. As a result, and unlike the approaches for non-orthogonally polarized communication systems described above, optimal beams may be selected, and the modification to the phase difference does not impact beam direction, which could result in transmission on a sub-optimal beam.

Figure 4:
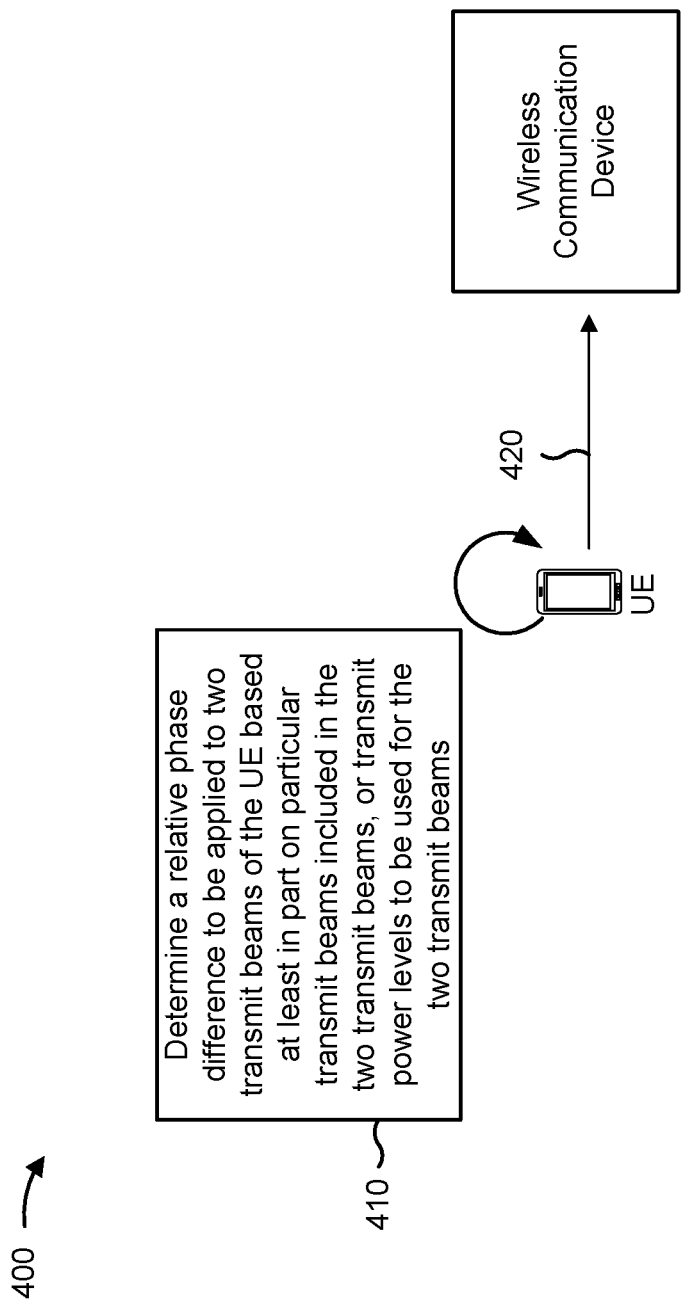
FIGS. 4-7 are diagrams illustrating one or more examples related to power density exposure control, in accordance with various aspects of the present disclosure.

FIG. 4 is a diagram illustrating an example 400 related to power density exposure control, in accordance with various aspects of the present disclosure. As shown in FIG. 4, example 400 includes a UE (e.g., UE 120) and a wireless communication device (e.g., BS 110, another UE 120, and/or the like).

As shown by reference number 410, the UE may determine a phase difference (e.g., a relative phase difference) to be applied to two transmit beams (e.g., a first transmit beam and a second transmit beam) of the UE based at least in part on particular transmit beams included in the two transmit beams (e.g., a transmit beam pair), or transmit power levels to be used for the two transmit beams. For example, the UE may determine the relative phase difference based at least in part on determining to transmit using the two beams (e.g., a first beam and a second beam). The two transmit beams may be associated with different transmit ports, different antennas, and/or the like, of the UE. In some aspects, the relative phase difference may be based at least in part on transmit antenna types (e.g., patch or dipole) of transmit antennas corresponding to independently transmitted beams (e.g., two polarized beams described in this example). For example, different types of antennas may have different patterns, orientations, polarizations, and/or the like. In some aspects, the two transmit beams may be directed to the same receiving device, such as a base station, another UE, and/or the like. Although some techniques are described herein in connection with two beams, such techniques can be applied to more than two beams, in some aspects.

In some aspects, a UE may select two beams based at least in part on an indication from a base station. For example, the UE may transmit uplink reference signals, such as sounding reference signals (SRSs), for multiple beams. The base station may measure uplink reference signals and may indicate the two beams to be used based at least in part on the measurements (e.g., the two beams with the best measurements relative to other beams). Alternatively, the base station may indicate more than two beams based at least in part on the measurements, and the UE may select two of the indicated beams. Alternatively, the UE may select the two beams based on measuring downlink reference signals from the base station. For example, the UE may measure downlink reference signals, such as synchronization signal blocks (SSBs) and/or channel state information reference signals (CSI-RSs), transmitted via multiple beams. The UE may measure the reference signals to determine signal characteristics (e.g., RSRP, RSRQ, RSSI, CQI, and/or the like), and may identify two receive beams with the best signal characteristics (e.g., relative to other beams). The UE may select two transmit beams that are part of corresponding beam pairs with the two receive beams. Alternatively and/or additionally, the base station may indicate two receive beams for the UE to use (e.g., based at least in part on a report transmitted by the UE to the base station), and the UE may select the two receive beams that are part of corresponding beam pairs with the two receive beams.

Relative phase differences may cause a power density exposure associated with the UE to satisfy a threshold. For example, the relative phase difference may cause the power density exposure associated with the UE to be minimized, to be below a threshold, and/or the like during a time period. The relative phase difference may be a static value (e.g., a value that is preconfigured, stored, or hard-coded in memory of the UE) for the particular transmit beams, for the transmit power levels, and/or the like. For example, the relative phase difference may be a static value for a beam pair combination, or a combination of beam pair and transmit power levels corresponding to the beam pair. Using this static value may reduce complexity and processing by the UE, thereby conserving UE resources (e.g., memory resources, processing resources, and/or the like).

The UE may store information that identifies the relative phase difference in memory resources of the UE. For example, the UE may store the information in a data structure in memory resources of the UE. The relative phase difference may be indexed in the memory resources by the particular transmit beams, the transmit power levels, and/or the like. For example, the relative phase difference may be indexed such that the UE can perform a lookup of the relative phase difference by information that identifies the two transmit beams, the transmit power levels, and/or the like.

The UE may configure the relative phase difference. For example, the UE may configure the relative phase difference randomly over time. Continuing with the previous example, the UE may configure the relative phase difference randomly over time to achieve gains over a worst-case power density exposure. This reduces or eliminates negative impacts on UE operations and/or communications that would otherwise occur as a result of the UE having to assume a worst-case power density exposure.

The relative phase difference may be further based at least in part on a detection result of a sensor of the UE (e.g., a thermal sensor, a proximity sensor, a thermal proximity sensor, and/or the like). For example, the detection result may indicate whether a portion of a user of the UE is within a threshold proximity of antennas corresponding to the two transmit beams. In this way, the relative phase difference may be based at least in part on an area of exposure on the UE to the two transmit beams (e.g., the relative phase difference may be based at least in part on a manner in which the UE is being held). This optimizes the relative phase difference for a use of the UE, thereby improving determination of the relative phase difference and minimizing excessive power density exposure control.

The UE may apply the relative phase difference to the two transmit beams prior to transmitting the two transmit beams. For example, the UE may adjust phases of signals (e.g., in a baseband modem) corresponding to the two transmit beams to apply the relative phase difference. In this case, the UE may apply the phase difference to information to be transmitted on one or more layers (e.g., information of a first layer and/or information of a second layer), or to data streams mapped to antenna ports, prior to transmission. By adjusting the phase difference between layers (where information on each layer is transmitted using a different transmit beam, and information on each layer may be different) or between data streams, there is no impact on beam direction because each layer or data stream is orthogonally polarized and is associated with independent beamforming. As a result, the UE may select optimal transmit beams (e.g., based at least in part on reference signal measurements), and may maintain that selection while reducing electromagnetic exposure by applying the phase difference to the layers after selecting the transmit beams.

Additionally, or alternatively, and as another example, the UE may apply the relative phase difference to the two transmit beams on time domain signal paths (e.g., in a transceiver of the UE) corresponding to the two transmit beams. In some aspects, applying the phase difference to two independent transmit beams appears to a receiver as channel phase, which can be compensated by the receiver without information about the phase applied at the transmitter. Because the receiver does not need to have any explicit information of the phase applied at the transmitter, no signaling is needed for this approach, which conserves network resources. This also conserves memory resources of the receiver that would otherwise be used to store information about the phase applied at the transmitter.

The UE may configure one or more radio frequency (RF) components associated with a transceiver of the UE to apply the relative phase difference to the two transmit beams. For example, the UE may configure the one or more RF components based at least in part on a code-book entry for the two transmit beams (e.g., the relative phase difference may be based at least in part on a relative phase difference between codewords, from the code-book entry, corresponding to the two transmit beams). Additionally, or alternatively, and as another example, the UE may configure the one or more RF components based at least in part on adding the relative phase difference to phase shifters corresponding to the two transmit beams. This facilitates use of static code-book entries with dynamic relative phase differences based at least in part on a dynamic parameter, such as a detection result, a transmit power level, and/or the like.

As shown by reference number 420, the UE may transmit, to the wireless communication device, concurrently using the two transmit beams after determining the relative phase difference. For example, the relative phase difference may have been applied to the two transmit beams in the manner described above prior to the UE transmitting the two transmit beams.

As indicated above, FIG. 4 is provided as an example. Other examples may differ from what is described with respect to FIG. 4.

Figure 5:
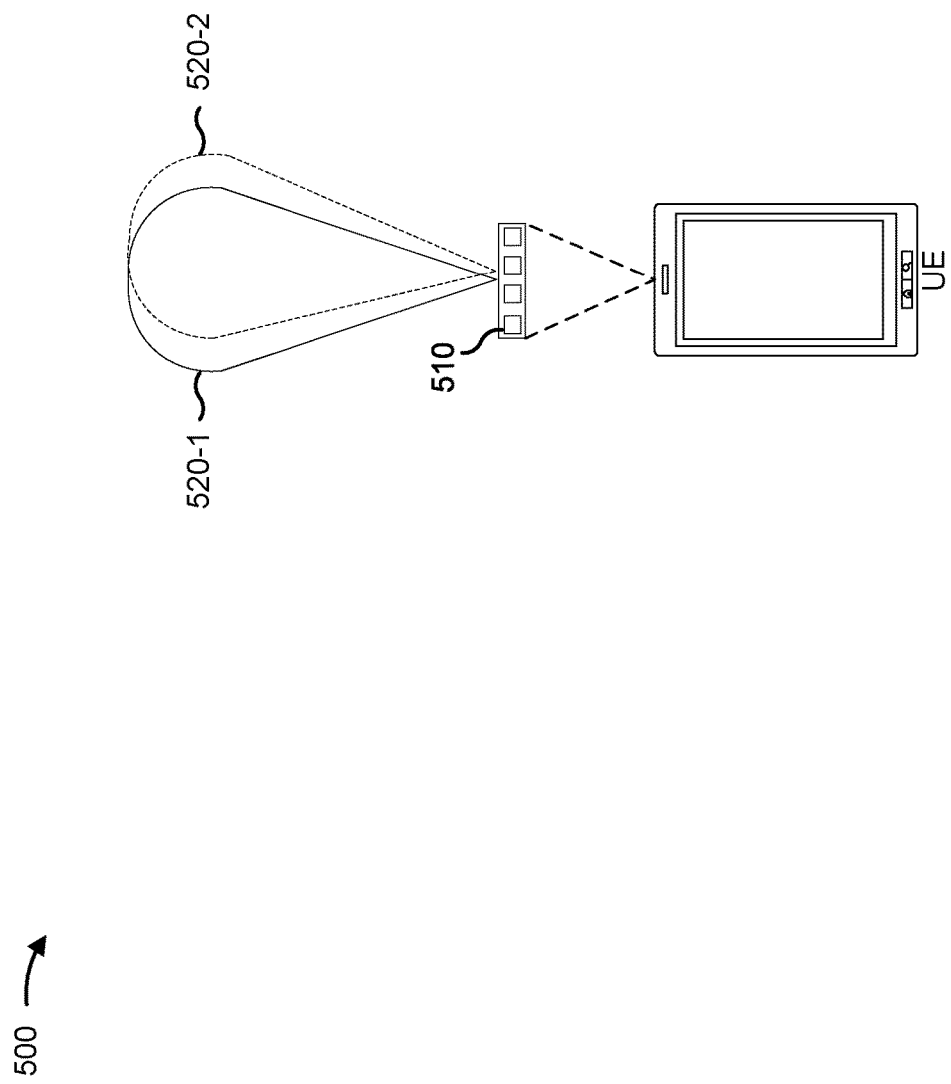

FIG. 5 is a diagram illustrating an example 500 related to power density exposure control, in accordance with various aspects of the present disclosure. As shown in FIG. 5, example 500 includes a UE (e.g., UE 120). As shown by reference number 510, the UE may include a dual polarization patch array (e.g., an array of transmit antennas). For example, the UE may use the dual polarization patch array to transmit two transmit beams, where the two transmit beams are configured with a relative phase difference in a manner similar to that described elsewhere herein. Reference numbers 520-1 and 520-2 show example transmit beams that the UE may transmit.

As indicated above, FIG. 5 is provided as an example. Other examples may differ from what is described with respect to FIG. 5.

Figure 6:
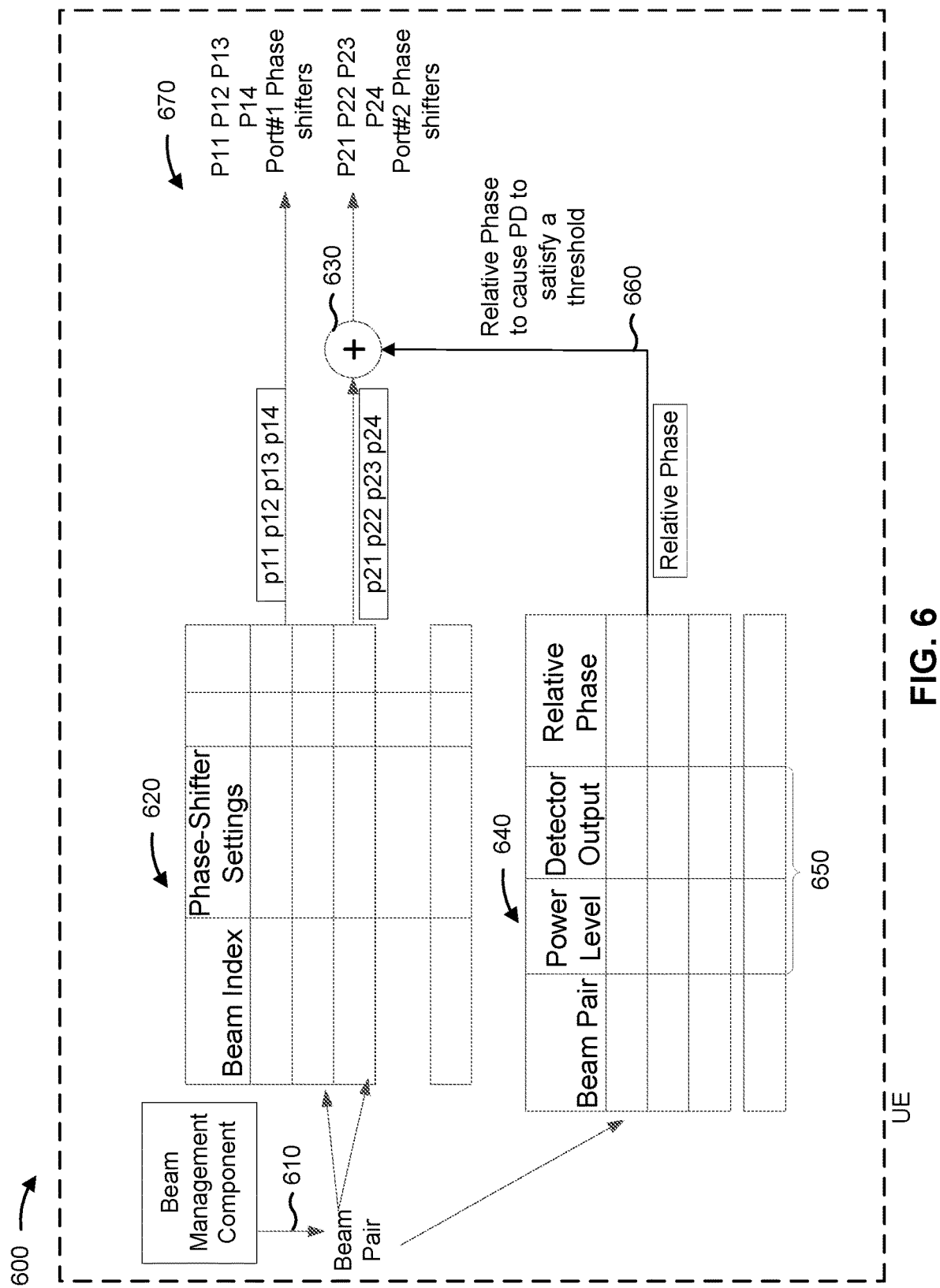

FIG. 6 is a diagram illustrating an example 600 related to power density exposure control, in accordance with various aspects of the present disclosure. As shown in FIG. 6, example 600 includes a UE (e.g., UE 120).

As shown by reference number 610, a beam management component (e.g., beam management component 334) of the UE may configure a beam pair (e.g., two transmit beams) for transmission from the UE. As shown by reference number 620, configuration of the beam pair may include selection of particular transmit beams from multiple possible transmit beams. For example, for a selected beam pair, corresponding to a pair of beam indexes, the UE may apply phase shifter settings to a group of phase shifters 630 (e.g., a group of Tx phase shifters 314, described above in connection with FIG. 3) to configure transmission using the selected beam pair. In some aspects, the UE may determine a phase shifter setting for a beam index (corresponding to a beam) using a table stored in memory of the UE, as shown. In some aspects, the phase shifter settings may include settings for multiple phase shifters (e.g., phase shifters 314), shown as p11, p12, p13, and p14 as an example of four phase shifter settings for four phase shifters P11, P12, P13, and P14 for a first antenna port and/or a first beam, and shown as p21, p22, p23, and p24 as an example of four phase shifter settings for four phase shifters P21, P22, P23, and P24 (e.g., shown as a group of phase shifters 630) for a second antenna port and/or a second beam. As described above in connection with FIG. 3, the settings of each phase shifter may be independent and separately configurable, according to the phase shifter settings, to provide a desired amount of phase shift and/or phase offset among antenna elements used to transmit via a beam.

As shown by reference number 640, based at least in part on the beam pair, the UE may determine a relative phase difference for the beam pair in a manner similar to that described elsewhere herein. For example, for a selected beam pair, the UE may apply a relative phase difference to configure transmission via the selected beam pair. In some aspects, the UE may determine the relative phase difference for a beam pair using a table stored in memory of the UE, as shown. As shown by reference number 650, the relative phase difference may be additionally based at least in part on one or more other factors, such as power levels to be used for the beam pair, detector output (e.g., a detection result), and/or the like in a manner similar to that described elsewhere herein. In some aspects, the UE may look up a relative phase difference in a table based at least in part on the selected beam pair, the power level, the detector output, and/or the like.

As shown by reference number 660, the beam management component, or another component of the UE, may apply the relative phase difference to one or more transmit beams of the beam pair, in a manner similar to that described elsewhere herein (e.g., to cause a power density (PD) to satisfy a threshold). For example, the relative phase difference may be added to a code-book entry for the beam pair. The UE may configure and/or apply additional phase shifter settings to one or more phase shifters in the group of phase shifters 630 to achieve the desired phase difference between the beam pair. In example 600, the UE applies additional phase shifter settings to the group of phase shifters 630 that beamform a transmission for the second antenna port and/or the second beam. In some aspects, the UE may apply the additional phase shifter settings to one or more phase shifters used to transmit only one of the beams of the beam pair. Alternatively, the UE may apply the additional phase shifter settings to one or more phase shifters used to transmit a first beam of the beam pair and to one or more phase shifters used to transmit a second beam of the beam pair. As shown by reference number 670, the UE may transmit the beam pair via transmit ports corresponding to transmit beams of the beam pair after applying the relative phase difference.

As indicated above, FIG. 6 is provided as an example. Other examples may differ from what is described with respect to FIG. 6.

Figure 7:
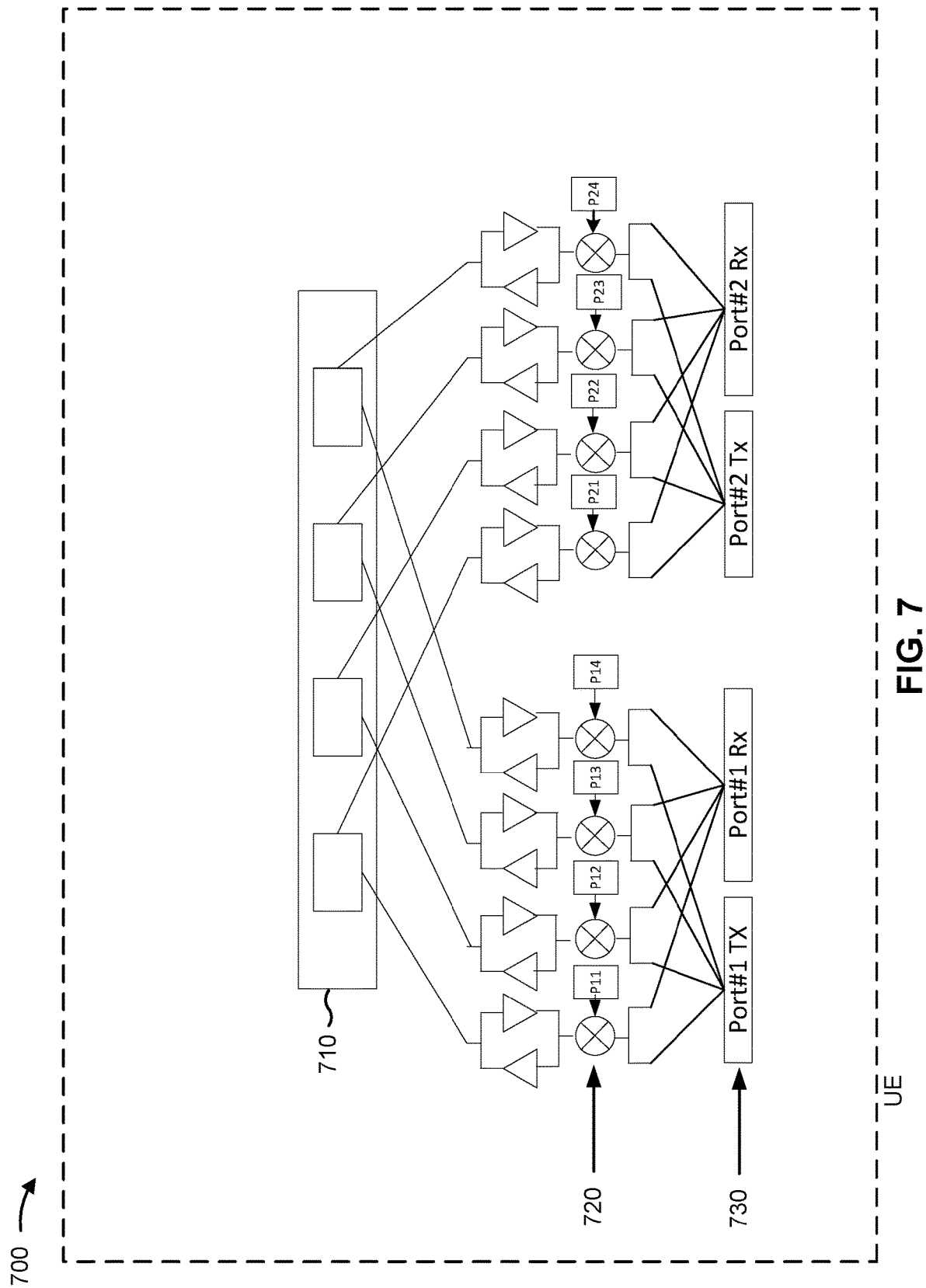

FIG. 7 is a diagram illustrating an example 700 related to power density exposure control, in accordance with various aspects of the present disclosure. As shown in FIG. 7, example 700 includes a UE (e.g., UE 120).

Reference number 710 shows a dual polarization patch array similar to that described elsewhere herein. For example, the UE may transmit two transmit beams similar to that described elsewhere herein using the dual polarization patch array. Reference number 720 shows an array of phase shifters associated with the UE. The array of phase shifters may apply a relative phase difference to two transmit beams in a manner similar to that described elsewhere herein. For example, four phase shifters P11, P12, P13, and P14 may receive phase shifter settings to control the relative phase difference between the two transmit beams, as described above in connection with FIG. 6. The array of phase shifters may apply the relative phase difference to a pair of ports of the UE (shown by reference number 730), such as by applying phase shifter setting to transmissions of one of the ports or both ports. Although FIG. 7 shows transmit (TX) and receive (RX) ports sharing phase shifters, other configurations where phase shifters are not shared between transmit and receive ports are contemplated.

As indicated above, FIG. 7 is provided as an example. Other examples may differ from what is described with respect to FIG. 7.

Figure 8:
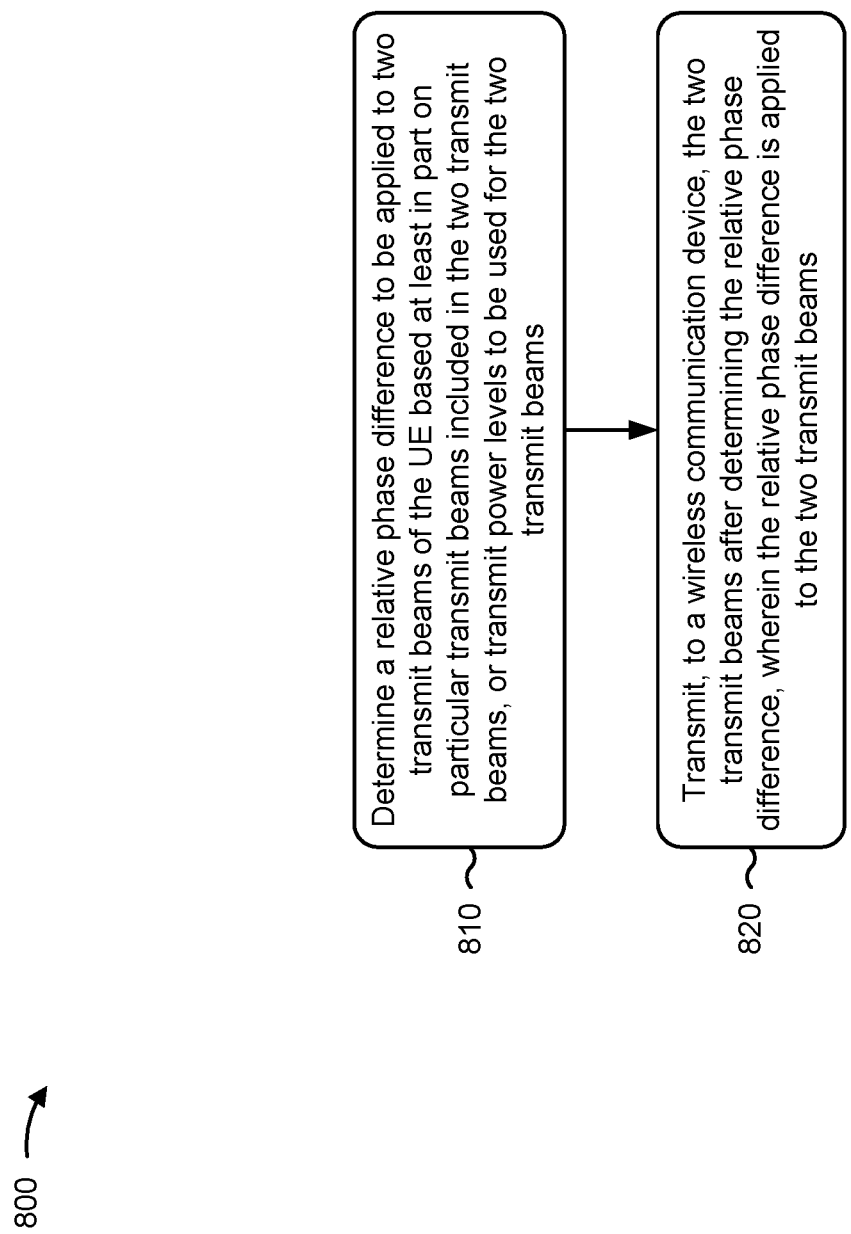
FIG. 8 is a diagram illustrating an example process performed, for example, by a user equipment (UE), in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with power density exposure control.

As shown in FIG. 8, in some aspects, process 800 may include determining a relative phase difference to be applied to two transmit beams of the UE based at least in part on particular transmit beams included in the two transmit beams, or transmit power levels to be used for the two transmit beams (block 810). For example, the UE (e.g., using controller/processor 280 and/or the like) may determine a relative phase difference to be applied to two transmit beams of the UE based at least in part on particular transmit beams included in the two transmit beams, or transmit power levels to be used for the two transmit beams, as described above.

As further shown in FIG. 8, in some aspects, process 800 may include transmitting, to a wireless communication device, the two transmit beams after determining the relative phase difference, wherein the relative phase difference is applied to the two transmit beams (block 820). For example, the UE (e.g., using controller/processor 280, transmit processor 264, TX MIMO processor 266, MOD 254, antenna 252, and/or the like) may transmit, to a wireless communication device, the two transmit beams after determining the relative phase difference, as described above. In some aspects, the relative phase difference is applied to the two transmit beams.

Process 800 may include additional aspects, such as any single aspect or any combination of aspects described below and/or in connection with one or more other processes described elsewhere herein.

In a first aspect, the relative phase difference causes a power density exposure associated with the UE to satisfy a threshold.

In a second aspect, alone or in combination with the first aspect, the relative phase difference is a static value for the particular transmit beams.

In a third aspect, alone or in combination with one or more of the first and second aspects, the relative phase difference is a static value for the transmit power levels.

In a fourth aspect, alone or in combination with one or more of the first through third aspects, the UE may store information that identifies the relative phase difference in memory resources of the UE.

In a fifth aspect, alone or in combination with the fourth aspect, the relative phase difference is indexed in the memory resources by the particular transmit beams or the transmit power levels.

In a sixth aspect, alone or in combination with one or more of the first through fifth aspects, the UE may configure the relative phase difference randomly over time.

In a seventh aspect, alone or in combination with one or more of the first through sixth aspects, the relative phase difference is further based at least in part on a detection result of a sensor of the UE, wherein the detection result indicates whether a portion of a user of the UE is within a threshold proximity of antennas corresponding to the two transmit beams. In an eighth aspect, alone or in combination with one or more of the first through seventh aspects, the UE may apply, prior to transmitting the two transmit beams, the relative phase difference to the two transmit beams by adjusting phases of signals corresponding to the two transmit beams.

In a ninth aspect, alone or in combination with one or more of the first through eighth aspects, the UE may apply, prior to transmitting the two transmit beams, the relative phase difference to the two transmit beams on time domain signal paths corresponding to the two transmit beams.

In a tenth aspect, alone or in combination with one or more of the first through ninth aspects, the UE may apply, prior to transmitting the two transmit beams, the relative phase difference to the two transmit beams by configuring one or more RF components associated with a transceiver of the UE.

In an eleventh aspect, alone or in combination with the tenth aspect, the UE may configure the one or more RF components based at least in part on a code-book entry for the two transmit beams.

In a twelfth aspect, alone or in combination with the eleventh aspect, the relative phase difference is based at least in part on a relative phase between codewords, from the code-book entry, corresponding to the two transmit beams.

In a thirteenth aspect, alone or in combination with the tenth aspect, the UE may configure the one or more RF components based at least in part on adding the relative phase difference to phase shifters corresponding to the two transmit beams.

In a fourteenth aspect, alone or in combination with one or more of the first through thirteenth aspects, the relative phase difference is across multiple ports corresponding to the two transmit beams.

In a fifteenth aspect, alone or in combination with one or more of the first through fourteenth aspects, the relative phase difference is based at least in part on transmit antenna types of transmit antennas corresponding to the two transmit beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
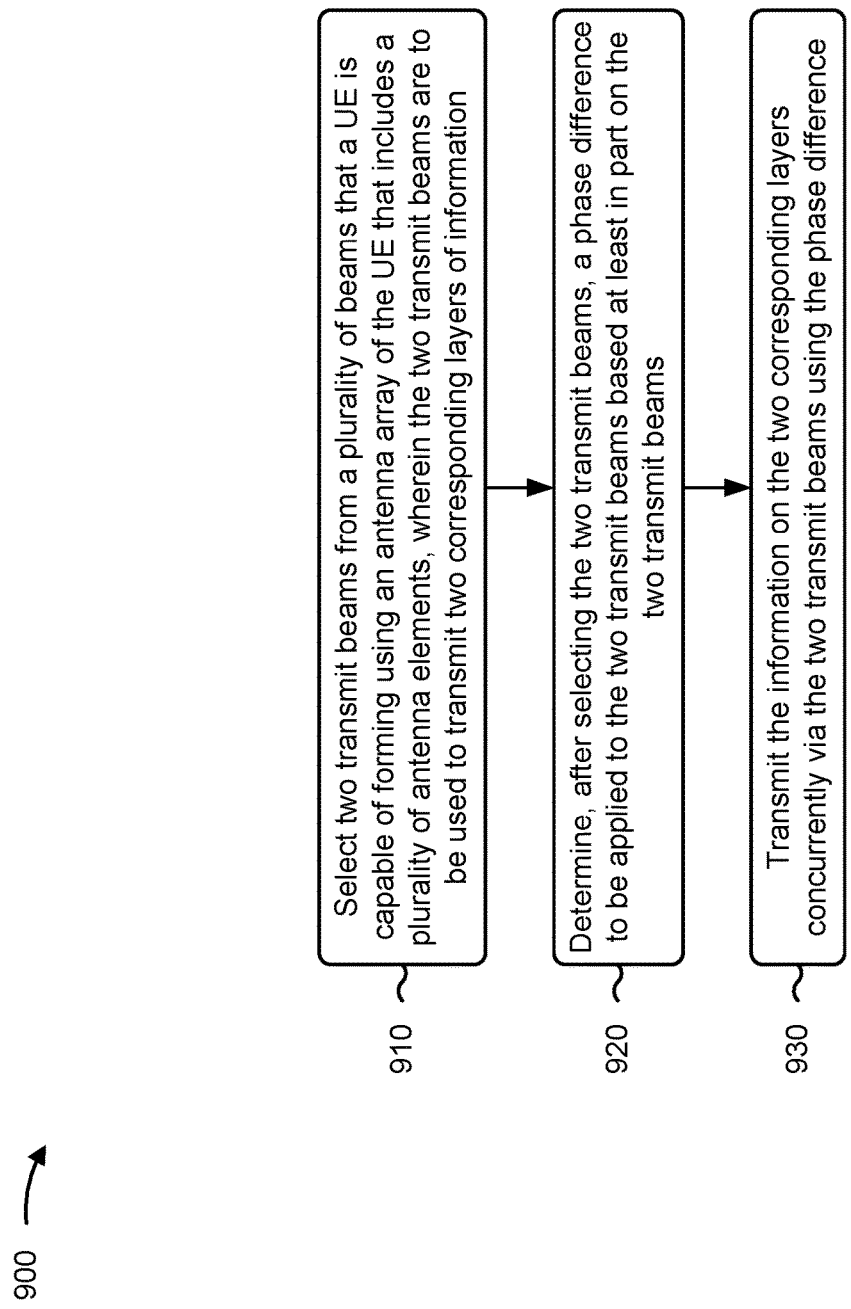
FIG. 9 is a diagram illustrating another example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with power density exposure control.

As shown in FIG. 9, in some aspects, process 900 may include selecting two transmit beams from a plurality of beams that the UE is capable of forming using an antenna array of the UE that includes a plurality of antenna elements, wherein the two transmit beams are to be used to transmit two corresponding layers of information (block 910). For example, the UE (e.g., using transmit processor 264, controller/processor 280, memory 282, modem 302, beam management component 324, and/or the like) may select two transmit beams from a plurality of beams that the UE is capable of forming using an antenna array of the UE that includes a plurality of antenna elements, as described above. In some aspects, the two transmit beams are to be used to transmit two corresponding layers of information.

As further shown in FIG. 9, in some aspects, process 900 may include determining, after selecting the two transmit beams, a phase difference to be applied to the two transmit beams based at least in part on the two transmit beams (block 920). For example, the UE (e.g., using transmit processor 264, controller/processor 280, memory 282, modem 302, beam management component 324, and/or the like) may determine, after selecting the two transmit beams, a phase difference to be applied to the two transmit beams based at least in part on the two transmit beams, as described above.

As further shown in FIG. 9, in some aspects, process 900 may include transmitting the information on the two corresponding layers concurrently via the two transmit beams using the phase difference (block 930). For example, the UE (e.g., using transmit processor 264, controller/processor 280, memory 282, modem 302, beam management component 324, splitter 310, amplifier 312, Tx phase shifter 314, amplifier 316, antenna array 318, one or more antenna elements 320, and/or the like) may transmit the information on the two corresponding layers concurrently via the two transmit beams using the phase difference, as described above.

Process 900 may include additional aspects, such as any single aspect or any combination of aspects described below and/or in connection with one or more other processes described elsewhere herein.

In a first aspect, the two corresponding layers are transmitted via the two transmit beams using a different polarization on each of the two transmit beams.

In a second aspect, alone or in combination with the first aspect, the phase difference is further determined based at least in part on respective transmit power levels to be used for the two transmit beams.

In a third aspect, alone or in combination with one or more of the first and second aspects, the phase difference is a static value for the transmit power levels.

In a fourth aspect, alone or in combination with one or more of the first through third aspects, the phase difference is further determined based at least in part on a detection result of a sensor of the UE, the detection result indicates whether a portion of a user of the UE is within a threshold proximity of antenna elements used to generate the two transmit beams.

In a fifth aspect, alone or in combination with one or more of the first through fourth aspects, the phase difference causes a power density exposure associated with the UE to satisfy a threshold.

In a sixth aspect, alone or in combination with one or more of the first through fifth aspects, the phase difference is a static value for the two transmit beams.

In a seventh aspect, alone or in combination with one or more of the first through sixth aspects, process 900 includes storing information that identifies the phase difference in memory resources of the UE, and the phase difference is indexed in the memory resources in association with information that identifies the two transmit beams.

In an eighth aspect, alone or in combination with one or more of the first through seventh aspects, determining the phase difference comprises configuring the phase difference randomly over time.

In a ninth aspect, alone or in combination with one or more of the first through eighth aspects, process 900 includes applying, prior to transmitting the information on the two corresponding layers, the phase difference to the two transmit beams by adjusting phases of signals corresponding to the two transmit beams.

In a tenth aspect, alone or in combination with one or more of the first through ninth aspects, process 900 includes applying, prior to transmitting the information on the two corresponding layers, the phase difference to the two transmit beams on time domain signal paths corresponding to the two transmit beams.

In an eleventh aspect, alone or in combination with one or more of the first through tenth aspects, process 900 includes applying, prior to transmitting the information on the two corresponding layers, the phase difference to the two transmit beams by configuring one or more radio frequency (RF) components associated with a transceiver of the UE.

In a twelfth aspect, alone or in combination with one or more of the first through eleventh aspects, configuring the one or more RF components comprises configuring the one or more RF components based at least in part on a code-book entry for the two transmit beams.

In a thirteenth aspect, alone or in combination with one or more of the first through twelfth aspects, the phase difference is based at least in part on a relative phase between codewords, from the code-book entry, corresponding to the two transmit beams.

In a fourteenth aspect, alone or in combination with one or more of the first through thirteenth aspects, configuring the one or more RF components comprises configuring the one or more RF components based at least in part on adding the phase difference to phase shifters corresponding to the two transmit beams.

In a fifteenth aspect, alone or in combination with one or more of the first through fourteenth aspects, the phase difference is across multiple ports corresponding to the two transmit beams.

In a sixteenth aspect, alone or in combination with one or more of the first through fifteenth aspects, the phase difference is based at least in part on transmit antenna types of transmit antennas corresponding to the two transmit beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Further to the above aspects and examples, additional embodiments and features are also contemplated. As one example, a method of wireless communication performed by a user equipment (UE) can generally comprise applying a phase difference between a first communication beam and a second communication beam. Communication beams can include transmission beams and reception beams. The method can also include transmitting information on the first communication beam and the second communication beam. Information transmission can occur concurrently on the first communication beam and the second communication beam. Additionally, and/or alternatively, communication may occur consecutively or at other timing arrangements (e.g., spaced apart timing). The method can also include selecting the first communication beam and the second communication. This selection can be accomplished by selecting two transmit beams from a plurality of beams in some approaches. Selection approaches can vary and may include random selections, desired beams corresponding to layers of interest, and or based on performance characteristics/indicia. Beam selection can be carried out for beams that a UE is capable of forming using an antenna array. The antenna array can include one or more antenna elements. Selected communication beams can include two transmit beams used to transmit two corresponding layers of information.

As yet another example, a user equipment can be configured for beam communications with phase difference application between communication beams. Such a user equipment can include various components, including a memory, a processor, and a communication interface (e.g., transmitter, receiver, transceiver, modem, radio frequency (RF) front-end chain, etc.). These components can be configured to interact cooperatively with each other (e.g., the processor can send instructions to one or more other components). The communication interface can apply a phase difference between a first communication beam and a second communication beam. The phase difference can be set to indicate information to a receiver without the UE having to use dedicated signaling. Applying phase difference to communications can help to limit and/or manage RF radiation/exposure as discussed herein.

Communication beams can be used in various manners in mmWave communications. For example, a communication interface of a UE can also transmit information on the first communication beam and the second communication beam. Additionally, and/or alternatively, communication beams can be used for reception beams to receive transmitted information. Information transmission can occur concurrently on the first communication beam and the second communication beam. Additionally, and/or alternatively, communication may occur consecutively or at other timing arrangements (e.g., spaced apart timing).

The UE's communication interface can also include selecting the first communication beam and the second communication. Selection can be accomplished by selecting two transmit beams from a plurality of beams in some deployments. Selection of beams can vary and include various approaches (e.g., round robin, sequential, random, opportunistic considering channel state, performance based considering historic operations, etc.) Beam selection can be carried out for beams that a UE is capable of forming using an antenna array. The antenna array can include one or more antenna elements. Selected communication beams can include two transmit beams used to transmit two corresponding layers of information.

As a further example, a user equipment can comprise means described herein to carry out functions and actions as described in the two preceding paragraphs. The means may include various structural components, physical arrangements, and operational details as illustrated in the several figures and described in associated text.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting two transmit beams from a plurality of beams that the UE is capable of forming using an antenna array of the UE that includes a plurality of antenna elements, wherein the two transmit beams are to be used to transmit two corresponding layers of information;
    determining, after selecting the two transmit beams, a phase difference to be applied to the two transmit beams based at least in part on the two transmit beams; and
    transmitting the information on the two corresponding layers concurrently via the two transmit beams using the phase difference.

2. The method of claim 1, wherein the information on the two corresponding layers is transmitted via the two transmit beams using a different polarization on each of the two transmit beams.

3. The method of claim 1, wherein the phase difference is further determined based at least in part on respective transmit power levels to be used for the two transmit beams.

4. The method of claim 3, wherein the phase difference is a static value for the transmit power levels.

5. The method of claim 1, wherein the phase difference is further determined based at least in part on a detection result of a sensor of the UE, wherein the detection result indicates whether a portion of a user of the UE is within a threshold proximity of antenna elements used to generate the two transmit beams.

6. The method of claim 1, wherein the phase difference causes a power density exposure associated with the UE to satisfy a threshold.

7. The method of claim 1, wherein the determined phase difference enables power density emissions of the UE to comply with a range of power density levels.

8. The method of claim 1, wherein the phase difference is a static value for the two transmit beams.

9. The method of claim 1, further comprising storing information that identifies the phase difference in memory resources of the UE, wherein the phase difference is indexed in the memory resources in association with information that identifies the two transmit beams.

10. The method of claim 1, wherein determining the phase difference comprises configuring the phase difference randomly over time.

11. The method of claim 1, further comprising applying, prior to transmitting the information on the two corresponding layers, the phase difference to the two transmit beams by adjusting phases of signals corresponding to the two transmit beams.

12. The method of claim 1, further comprising applying, prior to transmitting the information on the two corresponding layers, the phase difference to the two transmit beams on time domain signal paths corresponding to the two transmit beams.

13. The method of claim 1, further comprising applying, prior to transmitting the information on the two corresponding layers, the phase difference to the two transmit beams by configuring one or more radio frequency (RF) components associated with a transceiver of the UE.

14. The method of claim 13, wherein configuring the one or more RF components comprises configuring the one or more RF components based at least in part on a code-book entry for the two transmit beams.

15. The method of claim 14, wherein the phase difference is based at least in part on a relative phase between codewords, from the code-book entry, corresponding to the two transmit beams.

16. The method of claim 13, wherein configuring the one or more RF components comprises configuring the one or more RF components based at least in part on adding the phase difference to phase shifters corresponding to the two transmit beams.

17. The method of claim 1, wherein the phase difference is across multiple ports corresponding to the two transmit beams.

18. The method of claim 1, wherein the phase difference is based at least in part on transmit antenna types of transmit antennas corresponding to the two transmit beams.

19. A user equipment (UE) for wireless communication, comprising:
a memory; and
one or more processors operatively coupled to the memory, the one or more processors configured to:
select two transmit beams from a plurality of beams that the UE is capable of forming using an antenna array of the UE that includes a plurality of antenna elements, wherein the two transmit beams are to be used to transmit two corresponding layers of information;
determine, after selecting the two transmit beams, a phase difference to be applied to the two transmit beams based at least in part on the two transmit beams; and
transmit the information on the two corresponding layers concurrently via the two transmit beams using the phase difference.

20. The UE of claim 19, wherein the information on the two corresponding layers is transmitted via the two transmit beams using a different polarization on each of the two transmit beams.

21. The UE of claim 19, wherein the phase difference is further determined based at least in part on a detection result of a sensor of the UE, wherein the detection result indicates whether a portion of a user of the UE is within a threshold proximity of antenna elements used to generate the two transmit beams.

22. The UE of claim 19, wherein the phase difference causes a power density exposure associated with the UE to satisfy a threshold.

23. The UE of claim 19, wherein the phase difference is a static value for the two transmit beams.

24. The UE of claim 19, wherein the UE is configured to apply, prior to transmitting the information on the two corresponding layers, the phase difference to the two transmit beams by adjusting phases of signals corresponding to the two transmit beams.

25. The UE of claim 19, wherein the UE is configured to apply, prior to transmitting the information on the two corresponding layers, the phase difference to the two transmit beams on time domain signal paths corresponding to the two transmit beams.

26. The UE of claim 19, wherein the phase difference is across multiple ports corresponding to the two transmit beams.

27. A non-transitory computer-readable medium storing one or more instructions for wireless communication, the one or more instructions comprising:
one or more instructions that, when executed by one or more processors of a user equipment (UE), cause the one or more processors to:
select two transmit beams from a plurality of beams that the UE is capable of forming using an antenna array of the UE that includes a plurality of antenna elements, wherein the two transmit beams are to be used to transmit two corresponding layers of information;
determine, after selecting the two transmit beams, a phase difference to be applied to the two transmit beams based at least in part on the two transmit beams; and
transmit the information on the two corresponding layers concurrently via the two transmit beams using the phase difference.

28. The non-transitory computer-readable medium of claim 27, wherein the two corresponding layers are transmitted via the two transmit beams using a different polarization on each of the two transmit beams.

29. The non-transitory computer-readable medium of claim 27, wherein the phase difference is further determined based at least in part on a detection result of a sensor of the UE, wherein the detection result indicates whether a portion of a user of the UE is within a threshold proximity of antenna elements used to generate the two transmit beams.

30. An apparatus for wireless communication, comprising:
means for selecting two transmit beams from a plurality of beams that the apparatus is capable of forming using an antenna array of the apparatus that includes a plurality of antenna elements, wherein the two transmit beams are to be used to transmit two corresponding layers of information;
means for determining, after selecting the two transmit beams, a phase difference to be applied to the two transmit beams based at least in part on the two transmit beams; and
means for transmitting the information on the two corresponding layers concurrently via the two transmit beams using the phase difference.

31. A user equipment (UE) for wireless communication, comprising:
a memory; and
one or more processors operatively coupled to the memory, the one or more processors configured to:
select two transmit beams from a plurality of beams that the UE is configuring using an antenna array of the UE that includes a plurality of antenna elements;
apply a phase difference to the two transmit beams; and
transmit information on two corresponding layers via the two transmit beams.

32. The UE of claim 31, wherein the information on the two corresponding layers is transmitted via the two transmit beams using a different polarization on each of the two transmit beams.

33. The UE of claim 31, wherein the phase difference is based at least in part on respective transmit power levels to be used for the two transmit beams.

34. The UE of claim 33, wherein the phase difference is a static value for the transmit power levels.

35. The UE of claim 31, wherein the phase difference is based at least in part on the two transmit beams and a detection result of a sensor of the UE, and wherein the detection result indicates whether a portion of a user of the UE is within a threshold proximity of antenna elements used to generate the two transmit beams.

36. The UE of claim 31, wherein the phase difference causes a power density exposure associated with the UE to satisfy a threshold.

37. The UE of claim 31, wherein the phase difference enables power density emissions of the UE to comply with a range of power density levels.

38. The UE of claim 31, wherein the phase difference is a static value for the two transmit beams.

39. The UE of claim 31, wherein the one or more processors are further configured to store information that identifies the phase difference in memory resources of the UE, and wherein the phase difference is indexed in the memory resources in association with information that identifies the two transmit beams.

40. The UE of claim 31, wherein the one or more processors are further configured to configure the phase difference randomly over time.

41. The UE of claim 31, wherein the phase difference is applied to the two transmit beams prior to transmitting the information on the two corresponding layers and by adjusting phases of signals corresponding to the two transmit beams.

42. The UE of claim 31, wherein the phase difference is applied to the two transmit beams prior to transmitting the information on the two corresponding layers and on time domain signal paths corresponding to the two transmit beams.

43. The UE of claim 31, wherein the phase difference is applied to the two transmit beams prior to transmitting the information on the two corresponding layers and by configuring one or more radio frequency (RF) components associated with a transceiver of the UE.

44. The UE of claim 43, wherein the one or more RF components are configured based at least in part on a code-book entry for the two transmit beams.

45. The UE of claim 44, wherein the phase difference is based at least in part on a relative phase between codewords, from the code-book entry, corresponding to the two transmit beams.

46. The UE of claim 43, wherein the one or more RF components are configured based at least in part on adding the phase difference to phase shifters corresponding to the two transmit beams.

47. The UE of claim 31, wherein the phase difference is across multiple ports corresponding to the two transmit beams.

48. The UE of claim 31, wherein the phase difference is based at least in part on transmit antenna types of transmit antennas corresponding to the two transmit beams.

49. The UE of claim 31, wherein a first beam, of the two transmit beams, transmits information of a first layer of the two corresponding layers, and wherein a second beam of the two transmit beams transmits information of a second layer of the two corresponding layers.

50. The UE of claim 31, wherein information of each layer, of the two corresponding layers of information, is transmitted using a different transmit beam of the two transmit beams.

51. The UE of claim 31, wherein the information on the two corresponding layers is transmitted concurrently via the two transmit beams.

52. The UE of claim 31, wherein the two transmit beams are directed to a same receiving device.

53. The UE of claim 31, wherein the one or more processors are further configured to:
transmit uplink reference signals for the plurality of beams; and
receive an indication, of the plurality of beams, that is based at least in part on measurements of the uplink reference signals, wherein the two transmit beams are selected based on the indication.

54. The UE of claim 31, wherein the two transmit beams are selected based on measurements of downlink reference signals.

55. The UE of claim 31, wherein the one or more processors are further configured to:
apply a phase shifter setting, to a phase shifter, for a beam index corresponding to a beam of the two transmit beams.

56. The UE of claim 31, wherein the one or more processors are further configured to:
apply two or more phase shifter settings, to two or more phase shifters, for a first beam of the two transmit beams; and
apply two or more other phase shifter settings, to two or more other phase shifters, for a second beam of the two transmit beams.

57. The UE of claim 31, wherein the phase difference is based on a table stored in the memory.

58. The UE of claim 31, wherein the one or more processors are further configured to:
apply a phase shifter setting to one or more phase shifters used to transmit only one beam of the two transmit beams.

59. The UE of claim 31, wherein the one or more processors are further configured to:
configure, according to phase shifter settings, a group of phase shifters used to transmit the two transmit beams for each phase shifter of the group of phase shifters to provide a desired amount of phase shift.

60. The UE of claim 31, wherein the phase difference is based at least in part on one of:
an area of exposure on the UE to the two transmit beams, or
a manner in which the UE is being held.

61. A method of wireless communication performed by a user equipment (UE), comprising:
selecting two transmit beams from a plurality of beams that the UE is configuring using an antenna array of the UE that includes a plurality of antenna elements;
applying a phase difference to the two transmit beams; and
transmitting information on two corresponding layers via the two transmit beams.

62. The method of claim 61, wherein the information on the two corresponding layers is transmitted via the two transmit beams using a different polarization on each of the two transmit beams.

63. The method of claim 61, wherein the phase difference is based at least in part on respective transmit power levels to be used for the two transmit beams.

64. The method of claim 61, wherein the phase difference is a static value for the transmit power levels.

65. The method of claim 61, wherein the phase difference is based at least in part on the two transmit beams and a detection result of a sensor of the UE, and wherein the detection result indicates whether a portion of a user of the UE is within a threshold proximity of antenna elements used to generate the two transmit beams.

66. The method of claim 61, wherein the phase difference causes a power density exposure associated with the UE to satisfy a threshold.

67. The method of claim 61, wherein the phase difference enables power density emissions of the UE to comply with a range of power density levels.

68. The method of claim 61, wherein the phase difference is a static value for the two transmit beams.

69. The method of claim 61, further comprising storing information that identifies the phase difference in memory resources of the UE, wherein the phase difference is indexed in the memory resources in association with information that identifies the two transmit beams.

70. The method of claim 61, further comprising configuring the phase difference randomly over time.

71. The method of claim 61, wherein applying the phase difference comprises applying, prior to transmitting the information on the two corresponding layers, the phase difference to the two transmit beams by adjusting phases of signals corresponding to the two transmit beams.

72. The method of claim 61, wherein applying the phase difference comprises applying, prior to transmitting the information on the two corresponding layers, the phase difference to the two transmit beams on time domain signal paths corresponding to the two transmit beams.

73. The method of claim 61, wherein applying the phase difference comprises applying, prior to transmitting the information on the two corresponding layers, the phase difference to the two transmit beams by configuring one or more radio frequency (RF) components associated with a transceiver of the UE.

74. The method of claim 73, wherein configuring the one or more RF components comprises configuring the one or more RF components based at least in part on a code-book entry for the two transmit beams.

75. The method of claim 74, wherein the phase difference is based at least in part on a relative phase between code-words, from the code-book entry, corresponding to the two transmit beams.

76. The method of claim 73, wherein configuring the one or more RF components comprises configuring the one or more RF components based at least in part on adding the phase difference to phase shifters corresponding to the two transmit beams.

77. The method of claim 61, wherein the phase difference is across multiple ports corresponding to the two transmit beams.

78. The method of claim 61, wherein the phase difference is based at least in part on transmit antenna types of transmit antennas corresponding to the two transmit beams.

79. The method of claim 61, wherein a first beam, of the two transmit beams, transmits information of a first layer of the two corresponding layers, and wherein a second beam, of the two transmit beams, transmits information of a second layer of the two corresponding layers.

80. The method of claim 61, wherein information of each layer, of the two corresponding layers of information, is transmitted using a different transmit beam of the two transmit beams.

81. The method of claim 61, wherein the information on the two corresponding layers is transmitted concurrently via the two transmit beams.

82. The method of claim 61, wherein the two transmit beams are directed to a same receiving device.

83. The method of claim 61, further comprising:
transmitting uplink reference signals for the plurality of beams; and
receiving an indication, of the plurality of beams, that is based at least in part on measurements of the uplink reference signals, wherein the two transmit beams are selected based on the indication.

84. The method of claim 61, wherein the two transmit beams are selected based on measurements of downlink reference signals.

85. The method of claim 61, further comprising applying a phase shifter setting, to a phase shifter, for a beam index corresponding to a beam of the two transmit beams.

86. The method of claim 61, further comprising:
applying two or more phase shifter settings, to two or more phase shifters, for a first beam of the two transmit beams; and
applying two or more other phase shifter settings, to two or more other phase shifters, for a second beam of the two transmit beams.

87. The method of claim 61, wherein the phase difference is based on a table stored in the memory.

88. The method of claim 61, further comprising applying a phase shifter setting to one or more phase shifters used to transmit only one beam of the two transmit beams.

89. The method of claim 61, further comprising:
configuring, according to phase shifter settings, a group of phase shifters used to transmit the two transmit beams for each phase shifter of the group of phase shifters to provide a desired amount of phase shift.

90. The method of claim 61, wherein the phase difference is based at least in part on one of:
an area of exposure on the UE to the two transmit beams, or
a manner in which the UE is being held.

* * * * *